United States Patent
Tsukerman

(10) Patent No.: US 11,916,953 B2
(45) Date of Patent: Feb. 27, 2024

(54) METHOD AND MECHANISM FOR DETECTION OF PASS-THE-HASH ATTACKS

(71) Applicant: Cybereason, Inc., Boston, MA (US)

(72) Inventor: Phillip Tsukerman, Tel Aviv (IL)

(73) Assignee: Cybereason, Inc., Tokyo (JP)

( * ) Notice: Subject to any disclaimer, the term of this patent is extended or adjusted under 35 U.S.C. 154(b) by 1192 days.

(21) Appl. No.: 16/579,215

(22) Filed: Sep. 23, 2019

(65) Prior Publication Data

US 2020/0099715 A1 Mar. 26, 2020

Related U.S. Application Data

(60) Provisional application No. 62/735,745, filed on Sep. 24, 2018.

(51) Int. Cl.
*H04L 9/40* (2022.01)

(52) U.S. Cl.
CPC ................................ *H04L 63/1441* (2013.01)

(58) Field of Classification Search
None
See application file for complete search history.

(56) References Cited

U.S. PATENT DOCUMENTS

| | | | | |
|---|---|---|---|---|
| 10,135,830 B2 * | 11/2018 | Bercovich | ............... | H04L 63/10 |
| 10,375,095 B1 * | 8/2019 | Turcotte | ............. | H04L 63/1425 |
| 10,931,686 B1 * | 2/2021 | Mehta | ................. | H04L 63/1416 |
| 11,038,876 B2 * | 6/2021 | Cockerill | ............ | H04L 63/1433 |
| 2013/0097709 A1 * | 4/2013 | Basavapatna | ....... | H04L 63/1441 726/25 |
| 2013/0333040 A1 * | 12/2013 | Diehl | ........................ | G06F 9/46 726/22 |
| 2014/0143873 A1 * | 5/2014 | Stirtzinger | .......... | H04L 63/1408 726/23 |
| 2015/0067866 A1 * | 3/2015 | Ibatullin | ............. | H04L 63/0209 726/25 |
| 2015/0148109 A1 * | 5/2015 | Gupta | .................... | G06N 20/00 455/574 |
| 2015/0150125 A1 * | 5/2015 | Dulkin | ............... | H04L 63/1433 726/22 |
| 2017/0180399 A1 * | 6/2017 | Sukhomlinov | ..... | H04L 63/1425 |
| 2017/0230392 A1 * | 8/2017 | Dean | ..................... | G06F 21/552 |
| 2018/0054493 A1 * | 2/2018 | Heilpern | ............... | H04L 67/535 |
| 2018/0191746 A1 * | 7/2018 | De Knijf | ............. | H04L 43/0876 |
| 2018/0255079 A1 * | 9/2018 | Paine | ....................... | G06F 21/57 |
| 2019/0052659 A1 * | 2/2019 | Weingarten | ............. | H04L 67/34 |
| 2020/0120107 A1 * | 4/2020 | McGrew | ................ | G06N 20/00 |
| 2020/0175419 A1 * | 6/2020 | Bird | ..................... | H04L 67/5681 |

* cited by examiner

*Primary Examiner* — Christopher C Harris
(74) *Attorney, Agent, or Firm* — DLA PIPER LLP (US)

(57) ABSTRACT

A method of generating a baseline of expected behavior on a single machine or endpoint to accurately fingerprint the native behavior of the NTLM protocol on that particular endpoint in a network. By limiting the scope of a baseline to a single endpoint, the scope of the baseline can consist of expected behavior (including supported hash functions, version strings and various feature flags). Deviations from these behaviors are considered evidence of a redundant implementation of NTLM utilized by an attacker and thus as evidence of an attempted PTH attack. Using this method it is possible to accurately detect PTH attacks originating from all publicly known non-standard implementations of NTLM existing in tools such as Impacket, Metasploit, and Invoke-TheHash.

13 Claims, 1 Drawing Sheet

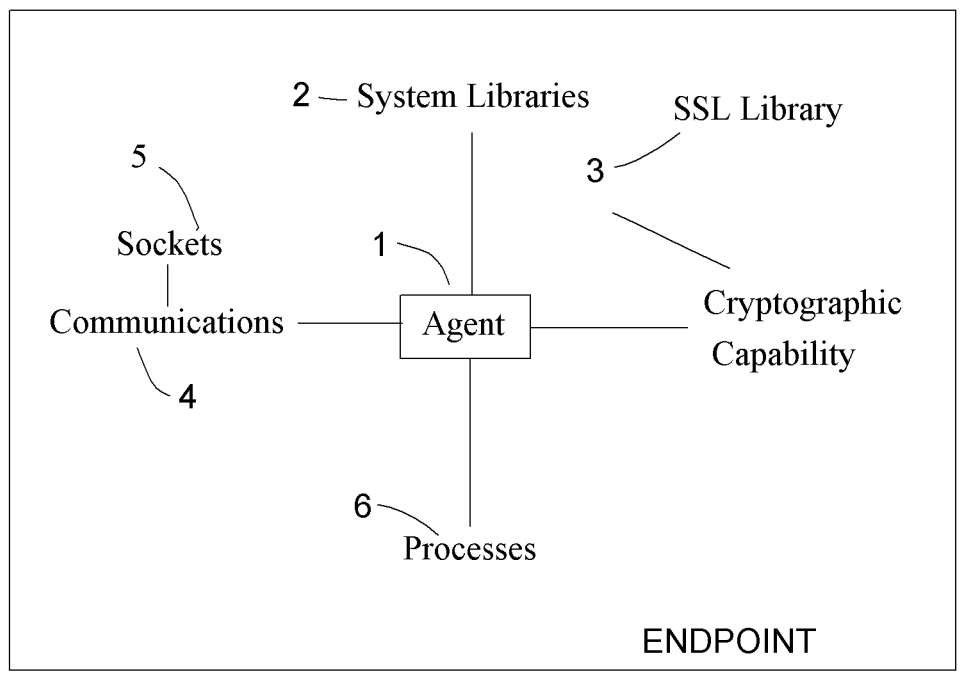

METHOD AND MECHANISM FOR DETECTION OF PASS-THE-HASH ATTACKS

This application is related to, and claims priority to, U.S. Provisional Patent Application No. 62/735,745 filed Sep. 24, 2018. Application 62/735,745 is hereby incorporated by reference in its entirety.

BACKGROUND

Field of the Invention

The present invention relates generally to the field of computer security and more particularly to a method and mechanism to detect a Pass-the-Hash attack e.g., on Microsoft's NTLM authentication protocol.

Description of the Problem Solved

New Technology LAN Manager (NTLM) is a suite of security protocols designed to authenticate users on a network. NTLM uses the exchange of various messages to authenticate a client. In particular NTLM operates in a challenge-response mode. The client wishing to enter the network first sends a Negotiate message to the server. The server answers with a Challenge message, and then the client answers the challenge with an Authenticate message. NTLM typically stores two hashed password values on the server. They are called the LM Hash and the NT Hash. Each hash value is 16 bytes (128 bits).

The server authenticates the client by first sending an 8 byte random number which is called the challenge. The client performs an operation on the challenge using one or both of the two hashes of the password, and returns either one or two 24 byte results to the server. The operation typically uses a one-way function. The hashes of the passwords constitute a shared secret between the client and the server. The server verifies the returned results, and if correct, authenticates the client.

Pass-the-Hash (PTH) is a hacking technique used to defeat NTLM authentication. The hacker must somehow possess the hash values of the client's password (usually stolen by various methods). Once the attacker has obtained the hashes, there is no need to know or attempt to recreate the actual password. The attacker typically uses the hashes they have obtained from an arbitrary user to authenticate into a system and impersonate that user. The basic process of using stolen hashes instead of actual passwords has been known in various forms since about 1997. Any system using NTLM (or similar methods) in combination with almost any standard communication protocol (SMB, FTP, RPC, HTTP, etc.) is at risk from this attack. For example, a single machine in a Windows domain that is not configured correctly, or might be missing a security patch, may allow an attacker to compromise the entire domain. It is well known that hackers have numerous tools available to automate discovering a machine's weaknesses.

In summary, a Pass-the-Hash (PTH) attack is an abuse of the NTLM authentication protocol which allows an attacker to perform authentication on a remote endpoint using only the hash of a password, without recovering or being in possession of the actual password. The NTLM protocol implementation found in most of the later versions of Windows OS does not allow a user to directly use a password hash for authentication purposes, which makes most variations of the attack depend on a non-standard implementation of the NTLM protocol of which there are many. However, some OS implementations do allow the user to utilize a password hash. It would be extremely advantageous to detect which systems and computers allow a PTH attack and to detect anomalous behavior of this and other attacks.

SUMMARY OF THE INVENTION

The present invention provides a baseline of expected behavior on a single machine or endpoint to accurately fingerprint the native behavior of the NTLM protocol on that particular endpoint in a network. By limiting the scope of a baseline to a single endpoint, the scope of the baseline can consist of expected behavior (including supported hash functions, version strings and various feature flags). Deviations from these behaviors are considered evidence of a redundant implementation of NTLM utilized by an attacker and thus as evidence of an attempted PTH attack. Using this method it is possible to accurately detect PTH attacks originating from all publicly known non-standard implementations of NTLM existing in tools such as Impacket, Metasploit, and Invoke-TheHash.

DESCRIPTION OF THE FIGURES

Attention is now directed to at least one illustration showing features of the present invention:

FIG. 1 shows an installed agent at an endpoint machine.
The scope of the present invention is not limited by what is shown in the FIGURE.

DESCRIPTION OF THE PREFERRED EMBODIMENT

The present invention can detect which systems and computers allow a PTH attack and can detect a PTH attack by sensing deviations from standard behaviors. The present invention creates a baseline of expected behavior of a particular endpoint including supported hash functions, version strings and feature flags.

The advantages of this approach are based upon two generalized techniques:
1) Malicious software activity detection by recognition of anomalous redundancies in implementations of functionality; and,
2) Enhancement of communication protocol anomaly detection by enriching baselines with endpoint data.

Both techniques will now be discussed:

Malicious Software Activity Detection by Recognition of Anomalous Redundancies in Implementations of Functionality There exist some circumstances under which multiple implementations of the same software functionality could be considered an artifact of activity by a malicious actor. The existence of such redundancies in sensitive functionalities such as authentication, communication and encryption within a suitable scope (such as a network, and endpoint, or even a single OS process), can indicate a possible malicious actor's intent to circumvent the limitations of the original or most updated implementation. The present invention assumes that in suitable circumstances, the mere existence of multiple implementations of sensitive functionality is enough to assume the compromise of an endpoint. In addition to powering the PTH detection mechanism, this approach can also be used to facilitate other novel detection technologies, such as those described below:

1) Code Injection Detection Via SSL Fingerprint Enumeration

The implementation and configuration of an SSL library may be fingerprinted using the list of supported encryption algorithms it provides. For an overview of some fingerprinting algorithms see en.wikipedia.org/wiki/TCP/IP_stack_fingerprinting and the list of fingerprinting tools such as ettercap and nmap. The mechanisms of the present invention are able to infer the existence of foreign malicious code inside a process by detecting processes which exhibit multiple distinct fingerprints. The existence of multiple fingerprints in a single process is enough to flag it as suspicious, even without any prior knowledge of the identity of the code behind each fingerprint.

2) Detection of Malware Monitoring Evasion Techniques Via Redundant Module Loading One of the techniques used by malware authors to evade detection via an operating system (OS) application interface (API) anti-virus hooking is to manually load additional copies of already existing OS libraries which are not hooked by the anti-virus software. This allows the malware to use the functionality of these extra libraries without being monitored by the anti-virus program. The present invention detects multiple instances of the same OS library being loaded into a single process. While the code of the redundantly loaded library is not known to be malicious in itself, the existence of multiple instances is enough to flag the process as suspicious.

One special case of vulnerability is when the system itself introduces additional libraries or modules beyond the prior baseline. However, the mere existence of multiple libraries and modules often can be considered suspicious.

Enhancing Communication Protocol Anomaly Detection by Enriching Baselines with Endpoint Data One of the major causes for misclassifications, both false positive and false negative, in mechanisms of communication protocol anomaly detection is the complexity of constructing an optimal behavioral baseline, deviations from which may be considered sufficiently anomalous. This problem stems from the inability to differentiate between behavioral variations originating from changes in configuration and context, and those which may be considered artifacts of malicious activity.

The present invention utilizes the presence of an endpoint-based agent to further enhance the baselining process, providing additional information, such as configuration and context data, and the identity of the OS process performing the communication. This information, normally unavailable during traffic analysis (but available by installing an endpoint program on the computers which can monitor the details of protocols used), allows a great enhancement of the efficacy of the behavioral baseline. In addition to powering the PTH detection mechanism, this approach can also be used to facilitate other novel detection technologies, such as those described below:

Detection of Cryptographic "Downgrade" Attacks

In these cases, a malicious actor may interfere in the communication process between two legitimate parties by forcing both sides to use a weaker cryptographic functionality supported by both sides, despite their existing ability to use stronger alternatives. By acquiring information on the configuration and capabilities of various cryptographic facilities, whether in the scope of an endpoint, or even the scope of a single process, the present invention is able to detect communications in the same scope that are inconsistent with the known capabilities.

Detection of Malicious Activity Via Anomalous HTTP User-Agent Strings

User-agent strings are commonly used to identify an HTTP client to a server. Detection mechanisms based on network traffic analysis are often designed to only detect known user-agents that are indicative for an attack, as the high variance in user-agents in the scope of a single endpoint's communications makes it hard to extract meaningful anomalies from the data. By enriching the data with telemetry collected from the endpoint itself, such as the identity of the process and software using a specific user-agent, the present invention is able to detect inconsistencies between the identities of a single process with the user-agent strings uses in practice, thus enabling the reliable use of anomaly detection techniques to discover malicious activity. In some cases, this can be moderated by detecting which processes are legitimately allowed to use multiple user-agent strings such as by white-listing known spiders.

Detection of Covert Communication Channels

By utilizing an endpoint agent to enumerate open sockets on a machine, the present invention is able to detect discrepancies between the list of sockets provided by the OS built-in implementation, and the communications seen in practice by analyzing network traffic, thus discovering possible bypass attempt of the OS built-in implementation in order to evade detection.

Baseline Generation

The present invention constructs a baseline of system and communication activity for a particular endpoint (machine). Significant deviation from the baseline can then indicate the presence an attacker or malware. In particular, it can detect Pass-the-Hash and similar attacks on authentication.

Once a baseline is established, anomalous redundancies can be immediately detected. Redundancies in sensitive processes such as authentication, communication or encryption can give an indication of a possible attack and the attacker's intent to circumvent the limitations of the original implementation. Baseline fingerprints of the sensitive processes and also of particular libraries such as the SSL library (which contains a list of supported encryption algorithms) can be compared to real-time operating fingerprints. The existence of multiple fingerprints in a single process, or the existence of a different fingerprint of a library, can immediately flag it as suspect. The fingerprint of redundant module loading such as multiple or additional copies of existing libraries again raises an immediate flag.

Detecting communication protocol anomalies is particularly difficult at a typical endpoint. The present invention uses the endpoint-based agent to baseline the communication process and obtain fingerprints such as configuration and context data, and the identity of each OS process performing communication. Using the fingerprints generated by this agent, it is much easier to detect attacks based on techniques like cryptographic downgrading, detecting inconsistencies between the identities of a single process with user agent strings uses, and detection of covert communication channels (such as anomalous HTTP).

A Pass-the-Hash attack has two parts: first, the advisory must obtain a valid set of password hashes (or the actual password to create the hashes from); and second, the advisory signs onto the network or domain impersonating the real owner of the hashes. To do this, the user may implement a weaker form of NTLM on a target machine.

The present invention concentrates on watching for deviations from the baseline fingerprint that indicate malicious activity. The present invention tries to prevent both steps by identifying weaknesses at a particular endpoint that would allow them to occur or the implementation of a weaker form of NTLM. As was previously stated, current OS implementations of NTLM generally require more than just the hashes to complete authentication, and are somewhat immune to a straight PTH attack. Therefore, it is the non-standard implementations of NTLM existing in tools such as Impacket, Metasploit, and Invoke-TheHash that signal a high vulnerability to a PTH attack.

FIG. 1 shows a block diagram of a system containing an embodiment of the present invention. An agent 1 is installed onto the endpoint machine being monitored. This agent can check, measure and baseline the system. The agent can be loaded manually onto the endpoint machine locally (which is the safest route), or it can be remotely downloaded from a network control point. The agent must of course come from a trusted source (such as a valid network administrator), and its own hash fingerprint or other verification should comply with security standards to make sure the agent itself has not been infected in any way. This is especially important if the agent is downloaded from the network.

Once the agent 1 is loaded and running, it begins to baseline the endpoint system by checking system libraries 2, cryptographic capabilities 3 in the SSL library, communications capabilities 4, list of implemented communication sockets 5, lists of running processes 6. As the endpoint system runs, the agent 1 continues to collect data on libraries, running processes and libraries. The agent typically generates unique fingerprints for each running process containing as much information as possible.

After, a sufficient amount of time, the agent has collected enough information to generate a baseline fingerprint of the entire endpoint system. This fingerprint can be stored locally at the endpoint, or communicated to a remote location (generally in encrypted form). The agent then continues to monitor all activity at the endpoint, and acts as a watchdog to flag any anomalous behavior such as the loading of a duplicate system library, the creation of an new socket, communication using a weaker encryption method than the system is capable of, the use of multiple user-agent HTTP strings by a particular process, the execution of a process that has a different fingerprint from the baseline fingerprint for that process.

SUMMARY

The present invention provides a method and mechanism for detecting malicious activity on an endpoint machine including Pass-the-Hash attacks by loading an agent onto the endpoint and baselining all endpoint activity and processes forming a fingerprint for the endpoint machine. After a sufficient baseline has been generated, the agent can flag any deviation from the norm as suspect. If such a flag turns out to be a false positive, after sufficient investigation, the baseline fingerprint can be modified to include the activity that caused the flag. In addition to simply baselining, the agent can determine the authentication methods that are implemented and flag any that would be weaker toward attacks such as Pass-the-Hash.

Several descriptions and illustrations have been presented to aid in understanding the present invention. One with skill in the art will realize that numerous changes and variations may be made without departing from the spirit of the invention. Each of these changes and variations is within the scope of the present invention.

The invention claimed is:

1. A computer-implemented method of preventing a malicious attack on a networked system comprising an endpoint machine, the computer-implemented method comprising:
   generating, by an agent executing on the endpoint machine, a plurality of baseline fingerprints of system activity of the networked system, the plurality of baseline fingerprints comprising baseline representations of the system activity;
   monitoring, by the agent, real-time system activity on the endpoint machine after said plurality of baseline fingerprints is generated;
   generating, by the agent, a plurality of real-time fingerprints based on the real-time system activity on the endpoint machine;
   determining, by the agent, that a Pass-the-Hash (PTH) attack is occurring by:
      comparing the plurality of real-time fingerprints to the plurality of baseline fingerprints based on the endpoint machine, and
      detecting a deviation between the plurality of real-time fingerprints and the plurality of baselines fingerprints; and
   flagging the real-time system activity associated with the detected deviation.

2. The computer-implemented method of claim 1 wherein the agent collects information on operating system (OS) implemented libraries as a portion of the fingerprint.

3. The computer-implemented method of claim 2 wherein the agent flags a loading of additional libraries.

4. The computer-implemented method of claim 2 wherein the agent examines at least one OS cryptographic library and includes at least one implemented cryptographic technique as part of the fingerprint.

5. The computer-implemented method of claim 4 wherein the agent flags a communication that attempts to force a cryptographic technique that is weaker than an available stronger alternative or standard protocol.

6. The computer-implemented method of claim 1 wherein the agent collects identities of processes using a Hypertext Transfer Protocol (HTTP) user-agent strings as part of the fingerprint.

7. The computer-implemented method of claim 6 wherein the agent detects inconsistencies based on the fingerprint between identities of a single process and user-agent strings being used in communication.

8. The computer-implemented method of claim 6 wherein the agent detect a single process using multiple user-agent strings.

9. The computer-implemented method of claim 8 wherein the agent white-lists known processes allowed to use multiple user-agent strings.

10. The computer-implemented method of claim 9 wherein the known processes are known spiders.

11. The computer-implemented method of claim 1 wherein the agent detects an existence of non-standard implementations of New Technology LAN Manager (NTLM).

12. The computer-implemented method of claim 1, wherein at least one of the plurality of baseline fingerprints comprises at least one of implemented communication sockets or user agent strings associated with authorized processes running on the endpoint machine.

13. The computer-implemented method of claim 1, further comprising:

receiving, by the agent, an indication that the detected deviation is a false positive; and based on the indicating, modifying, by the agent, the plurality of baseline fingerprints to include activity that triggered the flagging.

\* \* \* \* \*